United States Patent
Boutami et al.

(10) Patent No.: US 11,885,731 B2
(45) Date of Patent: Jan. 30, 2024

(54) OPTICAL PARTICLE DETECTOR AND METHOD OF MANUFACTURING THE SAME

(71) Applicants: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR); CPE LYON FORMATION CONTINUE ET RECHERCHE, Villeurbanne (FR); ECOLE CENTRALE DE LYON, Ecully (FR); INSTITUT NATIONAL DES SCIENCES APPLIQUEES DE LYON, Villeurbanne (FR); UNIVERSITE CLAUDE BERNARD LYON 1, Villeurbanne (FR)

(72) Inventors: Salim Boutami, Grenoble (FR); Maryse Fournier, Grenoble (FR); Gabriel Jobert, Grenoble (FR); Christian Seassal, Lyons (FR); Cécile Jamois, Caluire (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR); CPE LYON FORMATION CONTINUE ET RECHERCHE, Villeurbanne (FR); ECOLE CENTRALE DE LYON, Ecully (FR); INSTITUT NATIONAL DES SCIENCES APPLIQUEES DE LYON, Villeurbanne (FR); UNIVERSITE CLAUDE BERNARD LYON 1, Villeurbanne (FR)

( * ) Notice: Subject to any disclaimer, the term of this patent is extended or adjusted under 35 U.S.C. 154(b) by 83 days.

(21) Appl. No.: 17/448,254

(22) Filed: Sep. 21, 2021

(65) Prior Publication Data
US 2022/0091018 A1 Mar. 24, 2022

(30) Foreign Application Priority Data
Sep. 21, 2020 (FR) ..................... 20 09545

(51) Int. Cl.
*G01N 15/14* (2006.01)

(52) U.S. Cl.
CPC ................... *G01N 15/1434* (2013.01)

(58) Field of Classification Search
CPC ........... G01N 15/1434; G01N 15/0205; G01N 2015/1486; G01N 2015/1493;
(Continued)

(56) References Cited

U.S. PATENT DOCUMENTS

2018/0306697 A1* 10/2018 Kishima ............ G01N 15/1436
2020/0033244 A1* 1/2020 Boutami ................ G01N 15/14
(Continued)

FOREIGN PATENT DOCUMENTS

| EP | 3 598 102 A1 | 1/2020 |
| EP | 3 671 179 A1 | 6/2020 |
| FR | 3 062 209 A1 | 7/2018 |

OTHER PUBLICATIONS

French Preliminary Search Report dated Jun. 4, 2021 in French Application 20 09545 filed on Sep. 21, 2020, 13 pages (with English Translation of Categories of Cited Documents & Written Opinion).
(Continued)

*Primary Examiner* — Kevin Quarterman
*Assistant Examiner* — Akbar Hassan Rizvi
(74) *Attorney, Agent, or Firm* — Oblon, McClelland, Maier & Neustadt, L.L.P.

(57) ABSTRACT

An optical particle detector including at least one channel intended to receive a fluid carrying at least one particle, and across which light rays are intended to pass such that the light rays are partially scattered by the at least one particle, a plurality of photodetectors capable of receiving said scattered light rays, wherein the detector includes at least one optical waveguide configured to collect, at least at one entrance of the waveguide, light rays that were not scattered by the at least one particle and having crossed the channel, and to reinject the unscattered light rays into the channel through at least one exit of the waveguide.

18 Claims, 9 Drawing Sheets

(58) Field of Classification Search
CPC ........... G01N 15/1459; G01N 15/1484; G01N 21/51; G01N 21/53; G01N 15/1436; G01N 2015/0038; G01N 2015/0046; G01N 2015/0053; G02B 6/29395
See application file for complete search history.

(56) References Cited

U.S. PATENT DOCUMENTS

2020/0033246 A1* 1/2020 Jobert ................ G01N 15/0211
2020/0292436 A1* 9/2020 Jobert ................ G01N 15/1436

OTHER PUBLICATIONS

Von Bibra et al., "Mode profile modification of H+ ion beam irradiated waveguides using UV processing", Journal of Non-Crystalline Solids, vol. 239, 1998, pp. 121-125.
Li et al., "Miniaturized particulate matter sensor for portable air quality monitoring devices", Sensors, IEEE, 2014, 4 pages (abstract only).

* cited by examiner

OPTICAL PARTICLE DETECTOR AND METHOD OF MANUFACTURING THE SAME

TECHNICAL FIELD

The present invention relates to the field of the optical detection of particles in general and more particularly of micro-sized or even of nano-sized particles. One example application is that of optical particle counting.

Particularly advantageous fields of application, provided in a non-limiting manner, include for example: air quality monitoring, microbiological species detection, explosive powder detection, fire detection, and alarm systems with low sensitivity to false positives.

PRIOR ART

Particles are microscopic solid, liquid or wet solid objects suspended in the air. The sizes thereof vary from a few tens of nanometers to a few tens of micrometers. These particles originate from various sources such as forest fires, construction sites, industrial sites, or motor vehicles, etc.

When the concentration of these particles exceeds a certain threshold, they have a negative impact on the environment and/or public health. Some states have thus set maximum concentration limits. For example, the European Union allows maximum concentrations of 50 µg/m³ for particles comprised between 10 µm and 2.5 µm in size and 25 µg/m³ for particles smaller than 2.5 µm.

The presence and concentration of these particles must thus be accurately detected by size range.

Different particle detection methods exist, such as gravimetric, ionisation, beta attenuation, aerodynamic mobility, electrical mobility and optical detection methods.

The latter are advantageously simpler to implement, and more widespread.

Optical particle detectors are generally based on the detection of an interaction between light and particles. In practice, the particles to be detected pass into an area illuminated by a light source, typically a channel.

If particles are present in the illuminated area, they will absorb part of the light from the source and scatter another part of this light away from the main direction of propagation, according to the scattering phenomenon.

A first method of optical detection, referred to as a light obscuration measurement, thus consists of measuring the absorption of light through a cloud of particles or an accumulation of particles. This measurement allows the concentration of the particles to be determined using the Beer-Lambert law if the composition of the particle cloud is known a priori.

A second method consists in analysing the light scattered away from the optical axis. The angular analysis of the scattered light is carried out by recording a light scattering diagram. It allows the shape, size, refractive index and concentration of the particles to be determined. For example, the size, refractive index and concentration of particles can be determined using light scattering theories, for example the Mie theory (Ref.: Bohren and Huffmann, Absorption and scattering of light by small particles, Ed. Wiley and Sons, 1983).

Optical particle counters operate on the aforementioned principles. They are particular in that the illuminated area is geometrically limited, for example by focusing a laser source and/or by a microfluidic channel and/or by an aerodynamic lens system. This geometric limitation allows single particles to be detected rather than clouds.

One solution for producing such optical particle counters or detectors with an improved robustness and at a reduced cost is to integrate these counters/detectors into miniaturised chips using microelectronic and photonic technologies.

The French patent document FR3062209 describes such an integrated detector. This detector in particular comprises a discrete assembly of photodetectors forming a retina and reflective surfaces to project the image of the light scattered by the one or more particles onto the retina. A characteristic light scattering diagram of the particle is thus obtained.

In practice, the sensitivity of this type of detector appears to be limited and particles, in particular small particles, may not be detected.

There is thus a need to improve the sensitivity of particle detectors, particularly for detecting small particles. Reliable detection of these small particles is an important issue since they are generally the most dangerous to public health.

One purpose of the present invention is to provide such a particle detector that improves the detection of small particles.

The present invention further relates to a method for manufacturing such a particle detector.

Other purposes, features and advantages of the present invention will appear upon reading the following description and the accompanying drawings. It is understood that other advantages can be incorporated therein.

SUMMARY

In order to achieve these objectives, the present invention provides an optical particle detector comprising:
  at least one channel intended to receive a fluid carrying at least one particle, and across which light rays are intended to pass such that said light rays are partially scattered by the at least one particle, and
  a plurality of photodetectors capable of receiving said scattered light rays, Advantageously, the detector comprises at least one optical waveguide comprising at least a first part and a second part separated from one another by the channel, the first part of the waveguide having a first entrance and a first exit opening out onto the channel and the second part of the waveguide having a second entrance and a second exit opening out onto the channel, said first and second parts being arranged in such a way that the first entrance faces the second exit and the second entrance faces the first exit. The optical waveguide is configured to:
  collect, at least at one entrance of the waveguide selected from among the first and second entrances, light rays that were not scattered by the at least one particle and having crossed the channel, and to
  reinject said unscattered light rays into the channel through at least one exit of the waveguide selected from among the first and second exits.

Thus, the light rays not scattered by the at least one particle are recycled and can again be used to detect the particles. The proportion of useful light for the detection of particles thus increases relative to the total amount of light injected via the detector. For a given light output, the detector thus collects more rays scattered by a particle. This provides more information about this particle. The detection sensitivity is thus improved for a given power consumption level of the detector.

In the course of developing the present invention, it became apparent that, in the prior art detector described in the aforementioned French patent document FR3062209, a majority of the light injected into the illuminated area is not scattered by particles. The smaller the particles to be detected, the greater this proportion of unscattered light relative to the total amount of light injected. Thus, the proportion of useful light actually scattered by the particles is small in the aforementioned prior art detector. This may not be sufficient to detect particles, in particular small particles. A majority of the injected light is also wasted in the aforementioned prior art detector.

Conversely, the optical detector according to the present invention increases the proportion of light actually scattered by the particles. This improves the sensitivity of the detector. In particular, this improves the ability to detect small particles. The optical detector according to the present invention also makes it possible to limit any wastage of the injected light.

Furthermore, in the course of developing the present invention, it became apparent that, in the aforementioned prior art detector, part of the light that is not scattered by the particles and that cannot be used for the detection, can additionally cast a glare affecting the detector. Glare affecting the detector can thus be caused by stray light scattering, in particular scattered by the various faces and walls of the detector. This glare can completely prevent small particles from being detected.

By providing for the recovery, in the waveguide, of at least a part of the rays introduced into the channel but not scattered by the particles, the optical detector according to the invention limits the unscattered rays that reach the photodetectors. The proposed detector can thus reduce the glare affecting the photodetectors. This further improves the sensitivity of the detector and the ability to detect small particles.

Preferably, yet optionally, the detector further comprises a metal mirror configured to prevent light rays not scattered by the at least one particle and not collected by the waveguide from accessing the photodetectors. This metal mirror thus further limits the glare cast by unscattered and uncollected light rays affecting the detector. This non-limiting embodiment further improves the sensitivity of the detector, especially for small particles.

Thus, the present invention provides an effective solution for improving current detectors.

The present invention further relates to a method for manufacturing such a particle detector comprising:

at least one channel intended to receive a fluid carrying at least one particle, and across which light rays are intended to pass such that said light rays are partially scattered by the at least one particle;

a plurality of photodetectors capable of receiving said scattered light rays;

at least one optical waveguide configured to:

collect light rays not scattered by the at least one particle, and to reinject said unscattered light rays into the channel, This manufacturing method comprises the following steps of:

providing a substrate;

forming the optical waveguide by implanting ions into the substrate;

optionally, forming a metal minor on one face of the substrate;

forming the channel by drilling into the substrate at least at the optical waveguide, such that said channel crosses the optical waveguide, the optical waveguide thus comprising at least a first part and a second part separated from one another by the channel, the first part of the waveguide having a first entrance and a first exit opening out onto the channel and the second part of the waveguide having a second entrance and a second exit opening out onto the channel, said first and second parts being arranged in such a way that the first entrance faces the second exit and the second entrance faces the first exit;

providing a plurality of photodetectors; and assembling the photodetectors of said plurality with the substrate, by disposing the photodetectors at least partially around the channel, preferably by turning the face of the substrate carrying the metal mirror to face the photodetectors, such that the metal mirror is arranged between the optical waveguide and the plurality of photodetectors.

BRIEF DESCRIPTION OF THE FIGURES

The aims, purposes, features and advantages of the invention will be better understood upon reading the detailed description of embodiments thereof, which are shown by means of the following accompanying drawings, in which:

FIG. 2B is taken from the publication "M. L. von Bibra et al. Journal of Non-Crystalline Solids 239 (1998) 121-125".

Figure 1A:
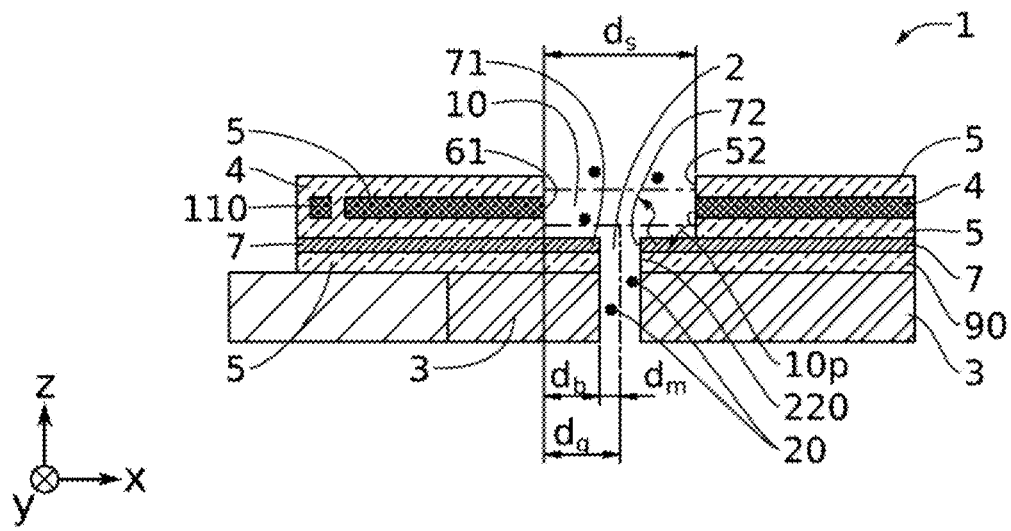
FIG. 1A diagrammatically shows a sectional view of a particle detector according to one embodiment of the present invention.

The drawings are provided by way of example and are not intended to limit the scope of the invention. They constitute diagrammatic views intended to ease the understanding of the invention and are not necessarily to the scale of practical applications. In particular, the dimensions of the various elements (particles, optical waveguide, mirror, transparent support) are not representative of reality.

DETAILED DESCRIPTION

Before giving a detailed description of the embodiments of the invention, it should be noted that the invention optionally comprises at least any one of the optional features given hereinbelow, which can be used as an alternative to or in combination with one another:

According to one example, the optical waveguide forms a discontinuous curved circuit (c) crossed by the channel.

According to one example, the discontinuous curved circuit has an oval shape.

According to one example, the optical waveguide is configured to reinject at least 90% of the unscattered light rays back into the channel, after each passage of said unscattered light rays across the channel.

According to one example, the optical waveguide comprises at least a first part and a second part separated from one another by the channel, the first part of the waveguide having a first entrance and a first exit opening out onto the channel and the second part of the waveguide having a second entrance and a second exit opening out onto the channel, said first and second parts being arranged in such a way that the first entrance faces the second exit and the second entrance faces the first exit.

According to one example, the optical waveguide is surrounded by a substrate.

According to one example, the optical waveguide has a refractive index $n_g$ and the substrate has a refractive index $n_s$ such that $n_g - n_s = \Delta n$ and $0 < \Delta n \ll 1$, so that the light rays guided by the optical waveguide are slightly divergent. Preferably $\Delta n < 0.1$ and more preferably $\Delta n < 0.01$.

According to one example, the optical waveguide is formed by the implantation of H+ hydrogen ions into the substrate, such that said optical waveguide comprises a buried region of the substrate having a hydrogen concentration comprised between $10^{19}$ cm$^{-3}$ and $10^{21}$ cm$^{-3}$. Such a concentration is typically achieved by the implantation of H+ ions at a dose comprised between $10^{15}$ ions/cm$^2$ and $10^{17}$ ions/cm$^2$.

According to one example, the light rays originate from a source and are guided by a primary waveguide coupled to said source. According to one example, the detector comprises the source emitting the light rays. According to one example, the detector comprises the primary waveguide guiding the light rays emitted by the source.

According to one example, the primary waveguide is critically coupled to the optical waveguide.

According to one example, the detector further comprises a source and a primary waveguide coupled to said source and to the optical waveguide, and the light rays are emitted from said source and guided by the primary waveguide and injected into the optical waveguide by a critical coupling between the primary waveguide and the optical waveguide.

According to one example, the detector further comprises a metal mirror configured to prevent light rays not scattered by the at least one particle and not collected by the waveguide from accessing the photodetectors.

According to one example, the metal mirror is sandwiched between the optical waveguide and the plurality of photodetectors, stacked in a direction transverse to a main direction of propagation of the light rays exiting the optical waveguide.

According to one example, the metal minor has an edge projecting from an entrance or from an exit of the optical waveguide, said edge being separated from the centre of the channel by a distance $d_m$ that is shorter than a distance $d_g$ separating the entrance or the exit of the optical waveguide from the centre of the channel, such that the optical waveguide is set back from the metal mirror relative to the centre of the channel.

According to one example, the plurality of photodetectors is optically accessible from a wall of the channel.

According to one example embodiment, the closed circuit comprises a plurality of discontinuities. Each discontinuity defines an entrance and an exit of the waveguide. A portion of the channel separates the entrance and the exit of the same discontinuity. Thus, the waveguide has as many entries and as many exits as there are discontinuities. According to one example embodiment, the waveguide comprises two discontinuities.

According to one example, these two discontinuities are located in the continuation of one another, thus defining a single channel extending along a main direction. According to an alternative example, these two discontinuities define two parallel channels.

According to one example, the ion implantation is a H+ hydrogen ion implantation.

According to one example, the substrate is assembled with the plurality of photodetectors via at least one further layer, said at least one further layer comprising, for example, a transparent support.

According to one example, the formation of the channel comprises at least one drilling operation selected from among laser drilling, mechanical drilling and chemical drilling.

According to one example, at least a part of the channel is polished so as to have an average surface roughness RMS of less than 2 nm.

According to one example, the method further comprises forming a metal mirror on one face of the substrate, said face being turned so as to face the photodetectors during assembly such that the metal mirror is disposed between the optical waveguide and the plurality of photodetectors.

According to one example, the metal mirror is at least partially formed by a layer of gold which also allows for assembly by thermocompression bonding. According to one example, assembly is carried out by thermocompression bonding from the layer of gold.

The preferred field of application of the present invention is that of the detection of particles of various sizes, preferably of micro-sized or even nano-sized particles. For example, the present invention can be used to detect particles originating from smoke, explosive powder, polluting particles, dust particles, allergen particles such as pollen, mould spores, or even carcinogenic particles, or biological particles such as bacteria, viruses, or exosomes.

The present invention applies to any type of particles carried by a fluid, whether liquid and/or gaseous.

The fluid present or flowing in the effective detection volume is, for example, air. This is the case for detectors integrated into the following systems: a fire alarm system, a fire detection system, an explosive powder detection system, a system for analysing the quality of a fluid such as air, or a pollution alarm system.

Alternatively, the fluid can be a liquid such as water. This is the case for detectors integrated into systems for detecting microbiological species.

Within the scope of the present invention, the term "particle" or its equivalents is defined as a component part of a physical system considered to be elementary with respect to the properties being studied.

The term particle refers in particular to a solid, liquid or wet solid object suspended in a fluid such as air and of microscopic size. For example, a particle is an element of matter whose largest dimension is less than a few millimeters ($10^{-3}$ m), preferably less than one millimeter, and preferably less than a few tens of micrometers ($10^{-6}$ m) and preferably less than one micrometer, or even in the nanometer range ($10^{-9}$ m). More generally, the particles are larger than 40 Å ($10^{-10}$ m) and are thus considered to be optically continuous. In general, these are objects made of material with dimensions that are small in comparison with the dimensions of the cavity or of the channel in which the particles flow.

The "size" or "diameter" of a particle is understood to mean the maximum distance between two points on the particle. Typically, a particle is considered to be an object of spherical geometry, the size thereof thus corresponds to the diameter of the sphere.

In the description hereinbelow, the term "absorption" or its equivalents refers to the phenomenon whereby the energy of an electromagnetic wave is transformed into another form of energy, for example by thermal dissipation. In the present description, a material is considered to be absorbent when it absorbs at least 50% of a light ray, preferably at least 75% and advantageously at least 90%.

In the description hereinbelow, the term "scattering" or its equivalents refers to the phenomenon whereby a propagation medium distributes the energy of an electromagnetic wave, for example of a light wave, in numerous directions.

In the description hereinbelow, the term "reflection" or its equivalents refers to the phenomenon of re-emission of incident light radiation from an element or a surface. In the present description, an element is considered to be reflective when it re-emits at least a part of the incident light radiation, this part being greater than or equal to 50%. The re-emitted part travels towards the same hemisphere from which the incident part originated. The reflective element can be characterised by a reflection factor of greater than 0.5.

The detector according to the invention comprises an optical waveguide. This optical waveguide is configured to guide the light. The light can propagate within the optical waveguide according to several optical modes of propagation, also referred to as "optical modes" or simply as "modes".

The plurality of photodetectors preferably typically takes the form of one or more photodetector arrays constituting pixels of the detector. These arrays are preferably held in the vicinity of the channel by a transparent support. This plurality of photodetectors can also be referred to as a "retina".

A material that is "transparent to a given wavelength" or simply "transparent" is understood to mean a material that allows at least 90% of the light intensity at this wavelength to pass therethrough.

The field of view can be the solid angle through which the detector is sensitive to electromagnetic radiation. In the present case, the field of view is preferably the solid angle defined by the pyramid with a rectangular base (said rectangular base being likened to the retina of the detector) and the vertex whereof is formed by the geometric centre of the particle. Depending on the case, the field of view can be the range of angles seen by the retina.

The one or more illuminating beams are emitted by one or more corresponding primary sources. These primary sources can be polychromatic or monochromatic. The light emitted by these sources is preferably in the visible range extending to the near ultraviolet and near infrared range, i.e. for a wavelength range comprised between 300 nm and 1000 nm. The "wavelength" of the source refers to a wavelength of interest, for example the wavelength with the highest light intensity or the central wavelength of the emission spectrum of the source.

In the case of a polychromatic source, this wavelength of interest can also be understood to be a wavelength range of a few tens of nanometers, for example in the order of 100 nm, preferably in the order of 50 nm.

In the case of a monochromatic or quasi-monochromatic source, the wavelength of interest is the only wavelength emitted by this source or the wavelength mainly emitted by this source.

A structural element is understood to mean a layer having a "base" made of a material A, a structural element, a layer comprising this material A only or this material A and optionally other materials, for example doping elements or alloying elements. Thus, if a transparent block is described as being "polymer-based", this means that it can be formed solely of polymers or of polymers and optionally other materials, for example an inorganic oxide.

It is specified that, within the scope of the present invention, the terms "on", "overlying", "covers" or "underlying" or the equivalents thereof do not mean "in contact with". Thus, for example, the deposition of a coating on a structural element does not necessarily mean that they are directly in contact with one another, but rather means that the coating covers at least partially the structural element while being either directly in contact therewith, or while being separated therefrom by at least one other layer or at least one other element. The relative terms "under", "on", "overlying", and "underlying" indicate relative positions along the z-axis of the reference frame shown in the accompanying figures.

Unless specifically indicated otherwise, technical features described in detail for a given embodiment can be combined with the technical features described within the context of other embodiments described by way of example and in a non-limiting manner. In particular, the number of channels, the different optical waveguide shapes and/or the different channel shapes shown in the figures can be combined to form another embodiment which is not necessarily illustrated or described. It goes without saying that such an embodiment is not excluded from the invention.

The terms "substantially", "about", and "in the order of" mean "to within 10%" or, when referring to an angular orientation, "to within 10"" and preferably "to within 5"". Thus, a direction substantially normal to a plane means a direction having an angle of 90±10° relative to the plane.

In order to determine the optical properties of the detector, transmission and/or field of view measurements can be carried out. For example, spectrometric and integrating sphere techniques will be used to carry out these measurements.

Simulation methods, for example Monte Carlo ray tracing, Finite Difference Time Domain (FDTD) or the Beam Propagation Method (BPM) can also be used to determine the propagation of the light rays through the optical waveguide of a detector.

The simultaneous presence of a channel, of a discontinuous optical waveguide forming a curved circuit and/or of a mirror can be an indication of the implementation of a detector as described in the present invention.

A first example of a detector according to the Invention will now be described with reference to FIGS. 1A and 1B. The operating principle of this detector 1 is as follows:

A source 100, which can be external to the detector 1, typically provides a beam of light rays. This beam of light rays 10 is at least partially guided by an optical waveguide 4 to the channel 2. The beam of light rays 10 thus crosses the channel 2 in which particles 20 to be detected are flowing (FIG. 1A). A small part of the light rays 10 is scattered by one or more particles 20 towards the photodetectors 3. The photodetectors 3 receive these scattered light rays. The information carried by these scattered light rays is then analysed in order to characterise the particles 20 flowing in the channel 2, for example the number, size and/or chemical composition thereof.

However, a large proportion of the light rays 10 crossing the channel 2 are not scattered or deflected. The direction of propagation of the light rays 10 in the detector is shown in FIG. 1B. Advantageously, the optical waveguide 4 is configured to recover a majority of the unscattered light rays 10. Typically, the light rays 10 are guided by the optical waveguide 4 to an exit 61 of the optical waveguide 4 opening out into the channel 2, and then, after crossing the channel 2, the unscattered light rays 10 are collected by an entrance 52 of the optical waveguide 4. These collected, unscattered light rays 10 are thus guided by the optical waveguide 4 and reinjected into the channel 2, for example at an exit 62 opening out into the channel 2. These light rays 10 from the exit 62 thus cross the channel 2 again. The same light ray 10 can thus cross the channel 2 at least twice. This increases the probability of a given light ray being scattered by a particle 20.

Preferably, the part of the light rays 10 that is not scattered after the second passage across the channel 2 is collected by an entrance 51 of the optical waveguide 4. These unscattered light rays 10 collected by the entrance 51 are then guided through the optical waveguide 4 and reinjected into the channel 2, for example at the exit 61.

A light ray 10 can thus cross the channel 2 several times, as long as it has not been scattered by a particle 20. This allows the light injected into the optical waveguide 4 to be recycled. For a given amount of light injected into the detector 1, this increases the proportion of light rays actually scattered by particles 20. This improves the efficiency of the detector 1. The sensitivity of the detector 1 is also improved. In particular, this improves the ability of the detector 1 to detect small particles, typically present in sizes of less than or equal to 100 nm.

Several examples of detectors 1 operating according to this general principle are described hereinbelow. The optical waveguide 4 is discontinuous and is crossed by the channel 2. The optical waveguide 4 shown in FIG. 1B comprises two parts 41, 42. These two parts 41, 42 are disjointed and separated by the channel 2. They can be separated by a distance ds in the order of a few hundred micrometers, for example 500 µm, to a few millimetres, for example 2 mm.

The channel 2 thus extends across a first detection arm 81 and a second detection arm 82. Each arm 81, 82 respectively comprises an entrance 52, 51 and an exit 61, 62 of the optical waveguide 4. A detection area 8 is thus defined in the channel 2, between an entrance and an exit of the optical waveguide 4. The flow of particles 20 in the channel 2 can be configured so that each particle successively crosses the detection areas 8 of the two detection arms 81, 82. In FIG. 1B, this corresponds to the particles 20 flowing in the plane of the sheet. This doubles the probability of detecting a particle. This can be useful for the qualitative detection of toxic particles, for example. According to another possibility, the flow of particles 20 in the channel 2 can be configured so that a particle crosses either of the detection areas 8 of the detection arms 81, 82. In FIG. 1B, this corresponds to the particles 20 flowing in a direction that is substantially normal to the plane of the sheet. This increases the detection capacity in terms of the number of particles that can be detected.

According to another example, the optical waveguide 4 comprises only one detection area on one detection arm. The channel 2 only crosses the optical waveguide 4 at one point. According to another example, the detector 1 comprises a plurality of separate channels 2. These can cross a single detection arm, or can cross one detection arm each, or even a plurality of detection arms each. Thus, different detection areas 8 can be envisaged for the detector 1 depending on the requirements.

Figure 1B:
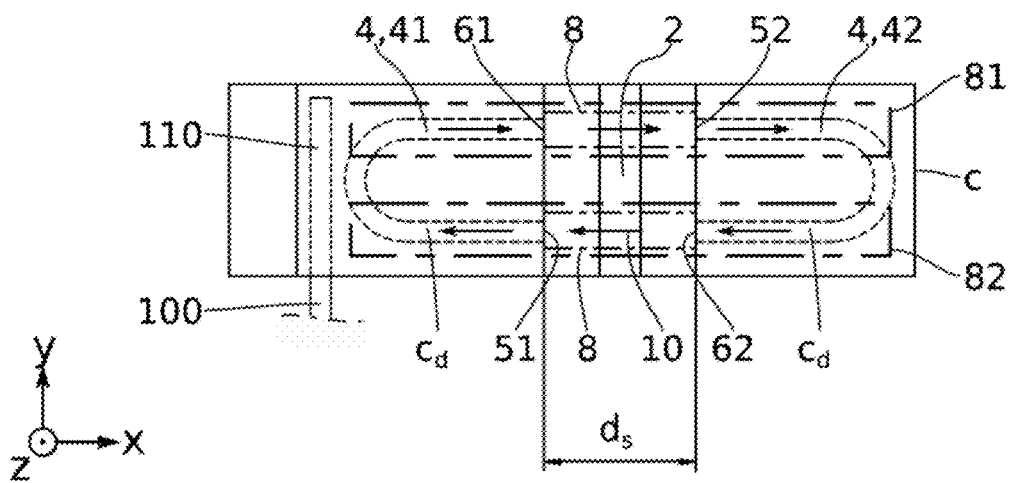
FIG. 1B diagrammatically shows an overhead view of a particle detector according to one embodiment of the present invention shown in FIG. 1A.

As shown in FIG. 1B, the optical waveguide 4 typically follows a curved circuit c crossed by the channel 2. This circuit can be oval or ring-shaped with straight portions $c_d$. The channel 2 cuts through the circuit c preferably at the straight portions $c_d$. An entrance of the optical waveguide 4 thus preferably has the same optical axis as an exit of the optical waveguide 4. The entrances 51, 52 are thus facing the exits 62, 61 respectively. This optimises the collection of the unscattered light rays 10. The circuit c preferably extends in an xy plane. The optical waveguide 4 is thus planar. This forms, typically in a z-direction normal to the xy-plane, a stack comprising the optical waveguide 4 and a planar array of photodetectors 3. This improves the compactness of the detector 1. According to another possibility, three-dimensional curved circuits can also be considered.

The photodetectors 3 typically form pixels of a detection array, for example a CMOS imaging device (i.e. an imaging device derived from complementary metal-oxide-semiconductor transistor technology). They are preferably located under the detection arms, at the edge and around the channel 2, as shown in FIG. 1A. Thus, a hole-based CMOS imaging device can be used to form the plurality of photodetectors 3 across which the channel 2 passes.

The light flowing through the optical waveguide 4 is preferably provided by a source 100. This source 100 can be a laser providing monochromatic light or a light-emitting diode providing polychromatic light. The light from the source 100 can be injected into a primary waveguide 110 coupled with the optical waveguide 4. This coupling preserves the ring shape of the optical waveguide 4. The light recycling circuit is thus not disturbed by the injection of light from the source 100. The coupling between the primary waveguide 110 and the optical waveguide 4 is preferably a critical coupling. Critical coupling occurs when the waveguides 110, 4 form a resonant system and when the resonant frequency substantially matches the frequency of the injected light. This is known to maximise the transfer of optical power from the primary waveguide 110 to the optical waveguide 4. The primary waveguide 110 is not necessarily located at the same height along the z-axis as the optical waveguide 4. It can be located above the optical waveguide 4. This positioning can be chosen according to the desired compactness of the detector 1.

The detector 1 preferably comprises a metal mirror 7 sandwiched along the z-axis between the optical waveguide 4 and the photodetector array 3. A transparent support 90 can also be sandwiched between the mirror 7 and the photodetectors 3.

The support 90 typically has a wall 220 opening out onto the channel 2. The photodetectors 3 are optically accessible to the rays scattered by the particles, through this wall 220. The photodetectors 3 preferably extend along the x-axis until they are vertical to this wall 220.

In particular, the mirror 7 is configured to limit glare affecting the photodetectors 3 due to stray scattering of the light rays. As shown in FIG. 1A, the mirror 7 preferably has one or more edges 71, 72 projecting towards the centre of the channel 2 and at least partially covering the support 90. These edges 71, 72 protrude from the entry 52 and exit 61 faces of the optical waveguide 4. The distance $d_m$ from the edge 71 to the centre of the channel 2 is shorter than the distance $d_g$ from the exit 61 (or symmetrically the entrance 52) to the centre of the channel 2. In this way, stray light rays 10p, for example scattered at the entrances/exits 52, 61, are reflected by the edges 71, 72 of the mirror 7. This prevents these stray light rays 10p from casting a glare affecting the photodetectors 3. By reducing the glare affecting the detector 1, the sensitivity of detector 1 is increased proportionally. The one or more edges 71, 72 typically have a dimension $d_b$ along the x-axis in the order of 10 µm. The distance $d_g$ is typically in the order of $d_s/2$. The distance $d_m$ is thus much longer than the dimension $d_b$, in contrast to that shown in FIG. 1A. The dimensions and distances shown in this drawing are deliberately modified for the sake of clarity.

A FDTD simulation of the glare affecting the photodetectors 3, in the presence of the mirror 7, shows that the only source of glare is the diffraction of the light rays from the optical waveguide 4 by the edge 71, 72 of the metal mirror 7. For a setback of 10 µm along the x-axis of the optical waveguide 4 from the edge 71, 72 of the metal mirror 7, the FDTD calculation shows that the rate of light rays from the optical waveguide 4 reaching the photodetectors 3 by diffraction at the edge 71, 72 is $1.10^{-7}$%. This rate is very low. It is in particular lower than the rate of light rays reaching the photodetectors 3 as a result of scattering by a single 100 nm particle. Such a reduction in glare procures a sensitivity of 30 ng/m3, for an illuminated detection area above the photodetectors 3 of 40 µm2×0.5 mm. This sensitivity is $10^7$ times better than the sensitivity of a detector without a metal mirror (0.3 g/m3). This greatly improves the ability of the detector 1 to detect small particles, typically less than or equal to 100 nm in size.

Figure 1C:
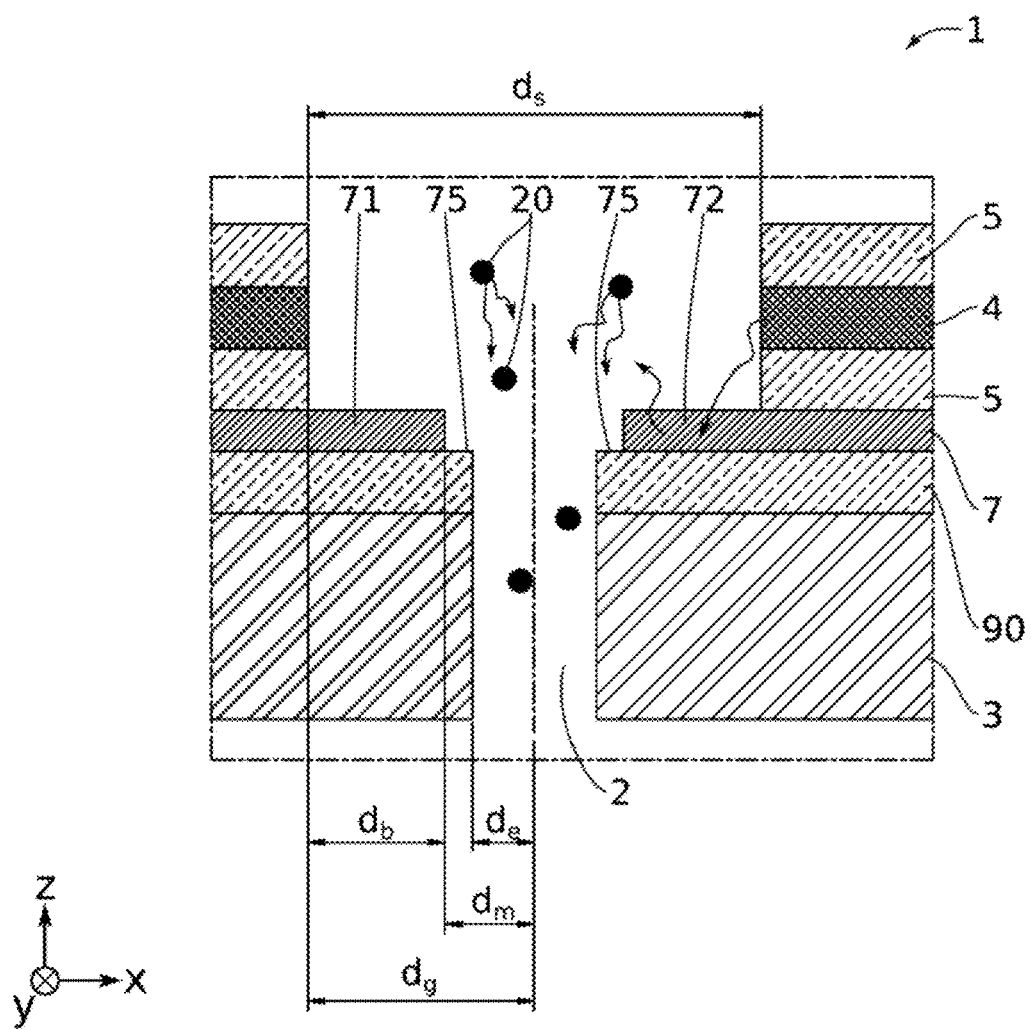
FIG. 1C diagrammatically shows a sectional view of a particle detector according to another embodiment of the present invention.

According to one possibility shown in FIG. 1C, the support 90 preferably has one or more shoulders 75 projecting towards the centre of the channel 2. These shoulders 75 protrude from the edges 71, 72 of the mirror 7. The shoulder 75 is separated from the centre of the channel by a distance that is less than the distance $d_m$ separating the edge 71 (or, symmetrically, the edge 72) from the centre of the channel 2. The distance can be comprised between 10 µm and 100 µm. Thus, the edges 71, 72 of the mirror 7 do not completely cover the support 90. The photodetectors 3 assembled with the support 90 can thus extend towards the centre of the channel 2 without being completely covered by the mirror 7. This improves the angle of view through which the photodetectors 3 receive the light rays scattered by the particles 20. In particular, optical access to the photodetectors is no longer procured solely through the one or more walls 220. The shoulders 75 improve the optical access to the photodetectors 3 for the scattered light rays.

Figure 2A:
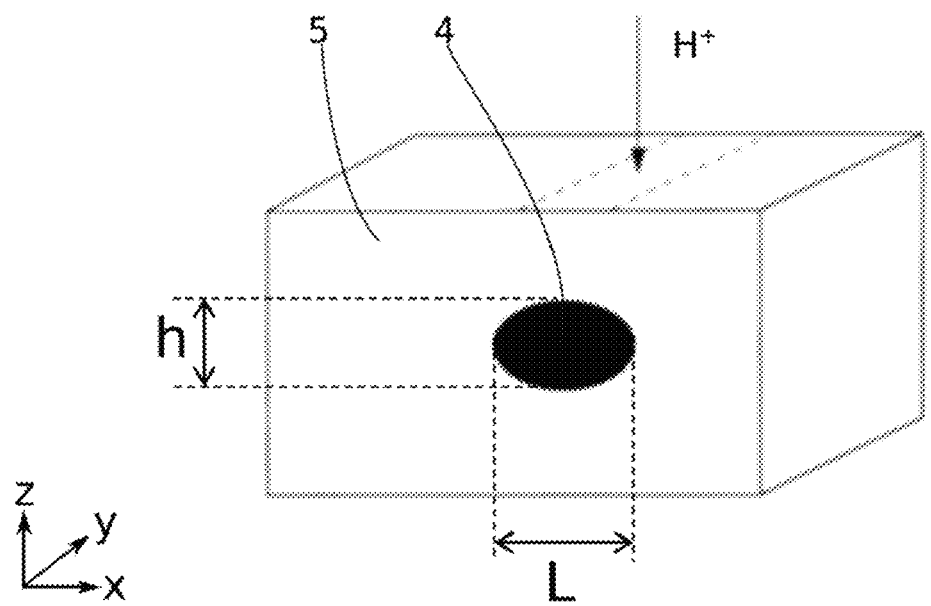
FIG. 2A diagrammatically shows an optical waveguide formed in an array according to one embodiment of the present invention.

As shown in FIG. 2A, the optical waveguide 4 is preferably an ion-implanted waveguide. Such a waveguide can be obtained by implanting H+ hydrogen ions within a substrate 5, for example a silica-based substrate. The waveguide thus formed after implantation can have an oval cross-section in the xz-plane. The dimensions of the optical waveguide 4 along the x- and z-axis are thus not necessarily equal. The dimension h along the z-axis of the optical waveguide 4 is typically in the order of a few microns, for example, comprised between 2 µm and 10 µm. The dimension L along the x-axis of the optical waveguide 4 is typically in the order of a few microns, for example, comprised between 3 µm and 12 µm.

Ion-implanted waveguides have the advantage of having a small refractive index contrast between the optical waveguide 4 and the substrate 5. Other optical waveguides with small index contrasts can also be used. From among this type of optical waveguides, a polymer waveguide locally modified with a laser can be used in the detector 1, for example.

The index contrast can also be modified by modifying the fractions of an optical polymer blend (for example OrmoCore/OrmoClad commercial polymers). The properties of glass can also be modified locally by exposure to a focused femtosecond laser, for example as presented in the document entitled "Femtosecond laser modification of glass, D. M. Krol, Journal of Non-Crystalline Solids, Volume 354, issues 2-9, 15 Jan. 2008, Pages 416-424".

Figure 2B:
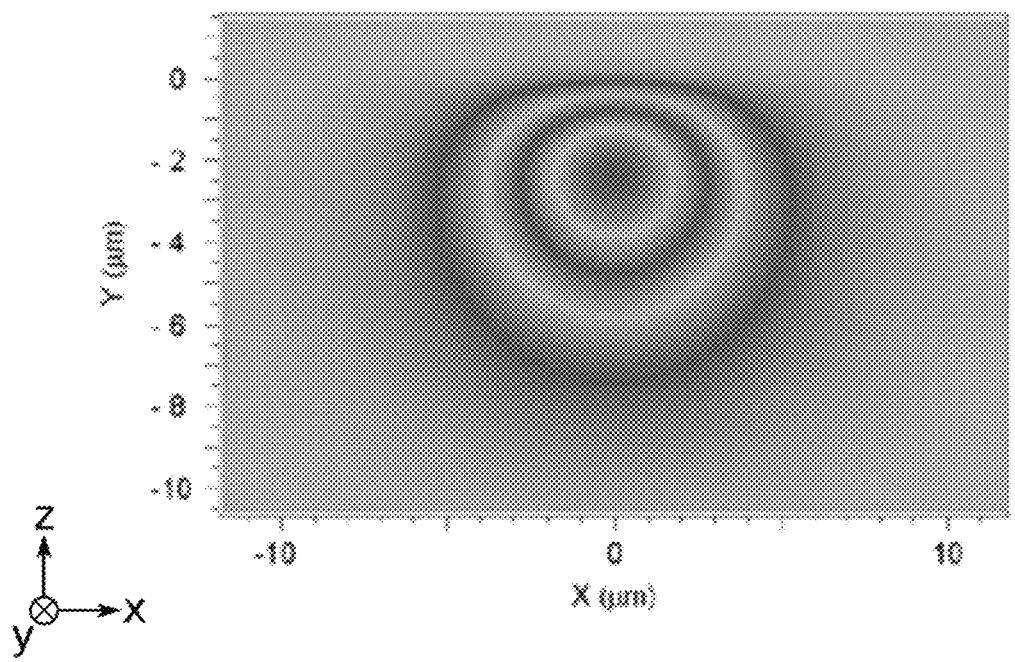
FIG. 2B shows a spatial intensity distribution of a fundamental optical mode guided by the optical waveguide shown in FIG. 2A. This

Typically, the optical waveguide 4 has a refractive index $n_g$ and the substrate 5 surrounding the optical waveguide 4 has a refractive index $n_s$ such that $n_g - n_s = \Delta n \ll 1$. In particular, $\Delta n < 0.1$, and preferably $\Delta n < 0.01$, for example $\Delta n \approx 10^{-3}$, is chosen. Such a so-called low index contrast $\Delta n$ allows light rays to be guided in very deconfined optical modes. The deconfined optical modes are spatially extended. Thus, as shown in FIG. 2B, the cross-section along the xz-axis of a deconfined optical mode can extend to about ten microns. As the wavelength of the light rays propagated according to these deconfined optical modes is typically in the order of a few hundred nanometers, for detection in the visible range, the optical modes guided by the ion-implanted optical waveguide 4 are slightly divergent. This results in a slightly divergent beam of light rays 10 at the exit 61, 62 of the optical waveguide 4. Such a beam is thus well collimated and can easily be reinjected into the entrance 51, 52 of the optical waveguide 4, after having crossed the channel 2. The light rays 10 can thus be extracted at the exit 61, 62 of the waveguide 4 and reinjected into a distant entrance 51, 52 of the waveguide 4 with moderate coupling losses.

Figure 3:
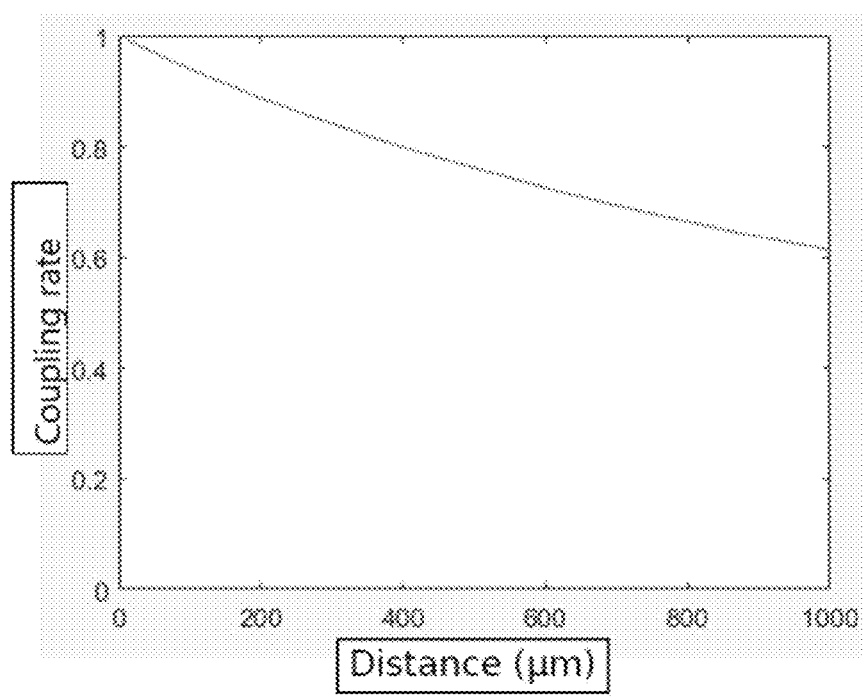
FIG. 3 shows a light ray reinjection rate within a discontinuous optical waveguide, as a function of the distance between an exit and an entrance of the optical waveguide located facing one another, according to one embodiment of the present invention.

FIG. 3 shows a calculation of the light ray reinjection rate between an exit and an entrance, facing one another, of an ion-implanted optical waveguide 4, as a function of the distance $d_s$ between the entrance and the exit, for an optical mode with a cross-section measuring 10 µm. This reinjection rate is 80% for a distance of a few hundred microns (about 400 µm). Light can thus be significantly recycled, while still having a channel of sufficient dimensions to allow particles to pass.

This detector can advantageously be manufactured using conventional micromanufacturing technologies. A first example of the manufacture of such a detector 1 is shown in FIG. 4A to 4H.

Figure 4A:
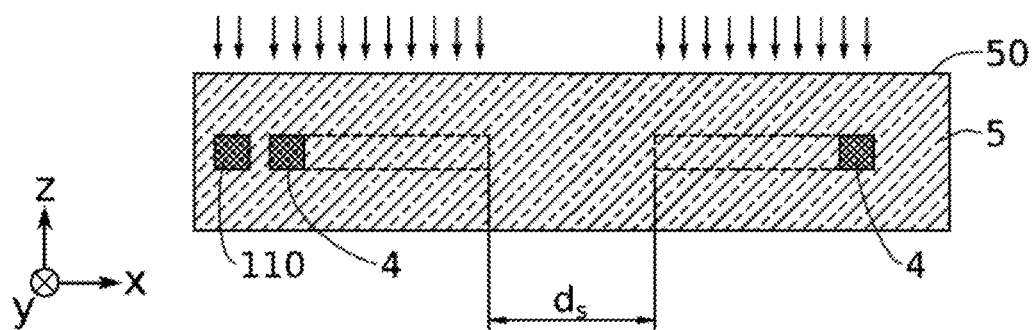
FIG. 4A to 4H diagrammatically show steps of a method for manufacturing a particle detector according to one embodiment of the present invention.
Figure 4B:
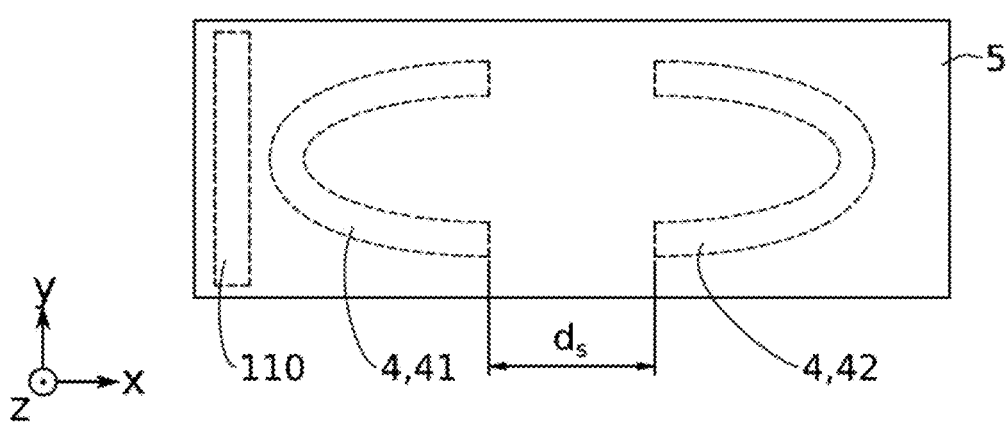

FIGS. 4A and 4B show the manufacture of the optical waveguide 4 by ion implantation of H+ ions into a substrate 5. The substrate 5 is preferably made of high-purity synthetic fused silica, for example SUPRASIL® from the manufacturer Heraeus. This ion-implanted optical waveguide 4 can typically be made using the method described in the document entitled: "Mode profile modification of H+ ion beam irradiated waveguides using UV processing, M. L. von Bibraa, J. Canning, A. Roberts, Journal of Non-Crystalline Solids 239 (1998) 121-12".

Ion implantation can be carried out using a direct write technique with a beam of H+ ions at an energy of 2.5 MeV. Different shapes, for example in two parts 41, 42 as shown in FIG. 4B, can be produced using this technique. The implanted dose is typically comprised between $1 \times 10^{15}$ ions/$cm^2$ and $1 \times 10^{17}$ ions/$cm^2$, for example in the order of $1 \times 10^{16}$ ions/$cm^2$. This results in a buried region about 50 µm beneath the face 50, about 5 µm high and about 7 µm wide. This buried region can typically have a hydrogen concentration comprised between $10^{19}$ $cm^{-3}$ and $10^{21}$ $cm^{-3}$. This buried region forms an optical waveguide 4. Ultraviolet (UV) exposure at a wavelength of 193 nm is preferably carried out, at a dose comprised between 0.2 KJ/cm² and 3 KJ/cm², in order to adjust the performance levels of the waveguide 4. The primary waveguide 110 can be made in the same way as the optical waveguide 4.

Figure 4C:
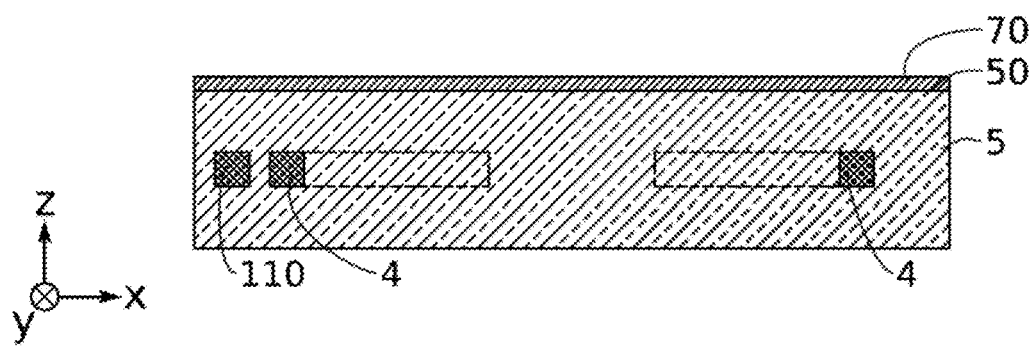

As shown in FIG. 4C, a 300 nm thick gold (Au) sealing layer 70 can be deposited by cathodic sputtering onto the face 50 of the substrate 5. An adhesion layer, typically a 10 nm thick titanium (Ti) layer (not shown), can be sandwiched between the gold sealing layer 70 and the substrate 5.

Figure 4D:
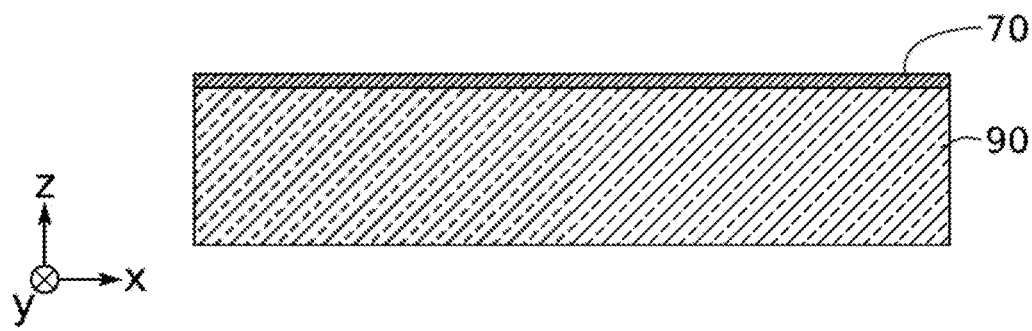

As shown in FIG. 4D, a transparent support 90 is preferably provided in order to subsequently assemble the photodetectors with the substrate 5. This support 90 further allows the depth of field separating the detection area from the photodetectors 3 to be adjusted. The transparent support 90 can be made of glass, for example Borofloat 33 glass. It is typically a few hundred microns thick, for example 725 µm as standard. Preferably, a second gold sealing layer 70 and/or a second Ti adhesion layer are deposited on this transparent support 90 in the manner described hereinabove. This allows the substrate 5 and the support 90 to be assembled by Au—Au thermocompression bonding. In a known manner, a few hundred nanometers of Au, for example 200 nm to 300 nm on each of the faces to be assembled, allow this Au—Au thermocompression bonding to be carried out. The metal sealing and/or adhesion layers can advantageously be subsequently used to form the metal mirror of the detector. According to one possibility, prior to assembling the substrate 5 and the support 90, the one or more sealing and/or adhesion layers can be patterned by lithography/etching so as to subsequently form the edges 71, 72 of the metal mirror.

Figure 4E:
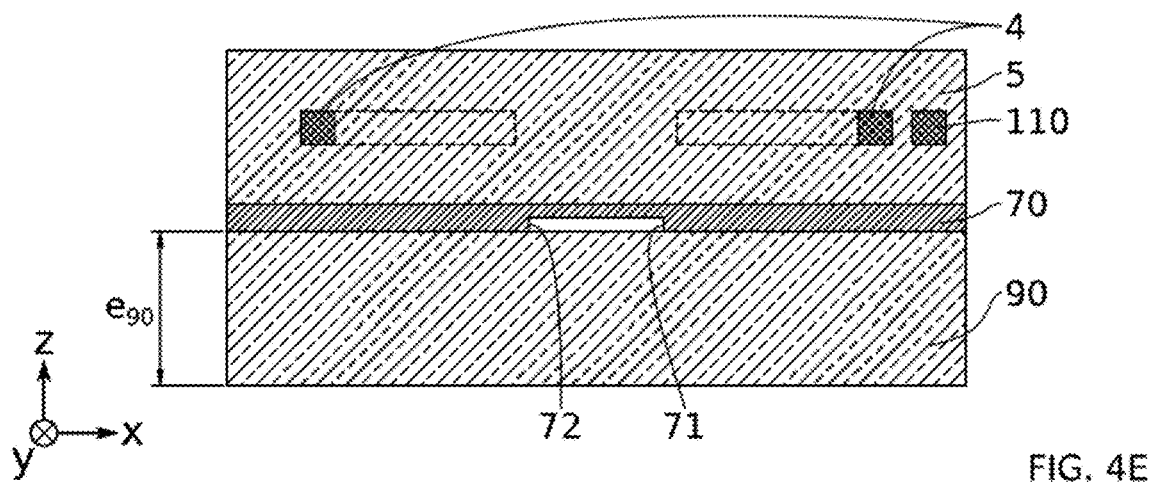

As shown in FIG. 4E, the substrate 5 comprising the ion-implanted optical waveguide 4 is assembled by Au—Au thermocompression bonding with the transparent support 90. After assembly, the thickness of the support 90 can be reduced by trimming and/or chemical-mechanical polishing. The thickness $e_{90}$ of the support 90 is thus preferably adjusted to between 200 µm and 500 µm. This maximises the angle of view through which the photodetectors receive the light rays scattered by the particles.

Figure 4F:
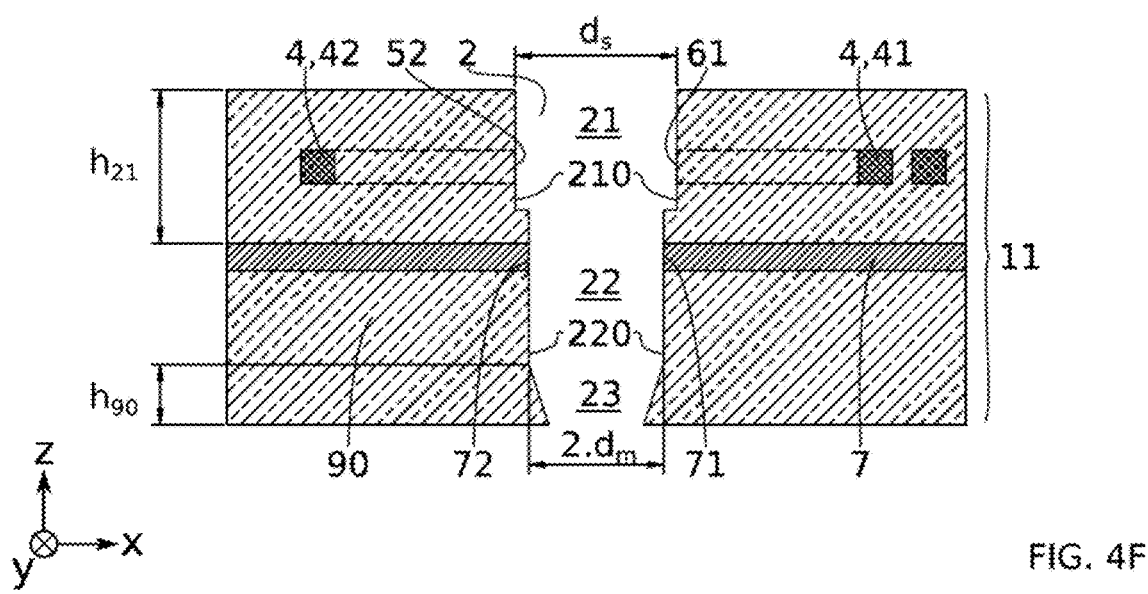

As shown in FIG. 4F, the channel 2 can then be formed along the z-axis through the substrate 5, between the parts 41, 42 of the optical waveguide 4, and through the support 90. The channel 2 typically has a cross-section, in the xy-plane, that varies according to the depth z. Thus, a first part 21 of the channel 2 flush with the entry face 51 and exit face 62 faces of the optical waveguide 4 can have a first cross-section, and a second part 22 of the channel 2 passing through the mirror 7 can have a second cross-section, which is smaller than the first cross-section. The first cross-section typically has a dimension $d_s$ along the x-axis and the second cross-section typically has a dimension $2 \cdot d_m$ along the x-axis. This forms a shoulder at the edges 71, 72 of the mirror 7.

The first and second parts 21, 22 of the channel 2 can be produced by partial drilling or sawing. The second part 22 of the channel 2 is firstly formed by sawing or drilling, respectively with a blade or a drill bit of dimension $2 \cdot d_m$ along the x-axis. The depth of sawing or of drilling is preferably chosen so as to maintain a bottom part of the support 90 with a thickness $h_{90}$ in the order of 200 µm. In this way, the two parts 41, 42 of the optical waveguide 4 remain integral with one another. This avoids the need for any subsequent step of realigning the parts of the optical waveguide relative to one another. The first part 21 of the channel 2 is then formed by sawing or drilling, respectively with a blade or a drill bit of dimension ds along the x-axis, where, typically, $d_s = 2 \cdot d_m + 20$ µm. In such a case, the sawing or drilling depth $h_{21}$ is typically less than or equal to 100 µm. The blades or the drill bits preferably give the walls 210, 220 of the channel 2 an optical polished finish. Such a finish typically corresponds to an RMS average roughness of less than 2 nm. This limits the stray light scattering phenomenon, in particular at the edges 71, 72. An optical polished finish ultimately reduces the glare affecting the photodetectors. An optional annealing or chemical treatment step after drilling or sawing can be carried out in order to reduce the roughness and/or improve the surface finish of the channel.

A third part 23 of the channel 2 can then be formed by laser drilling. Other embodiments of the parts 21, 22, 23 of the channel 2 are conceivable. In particular, chemical etching (wet etching) or plasma etching (dry etching) can be carried out as an alternative to or in combination with mechanical drilling.

Figure 4G:
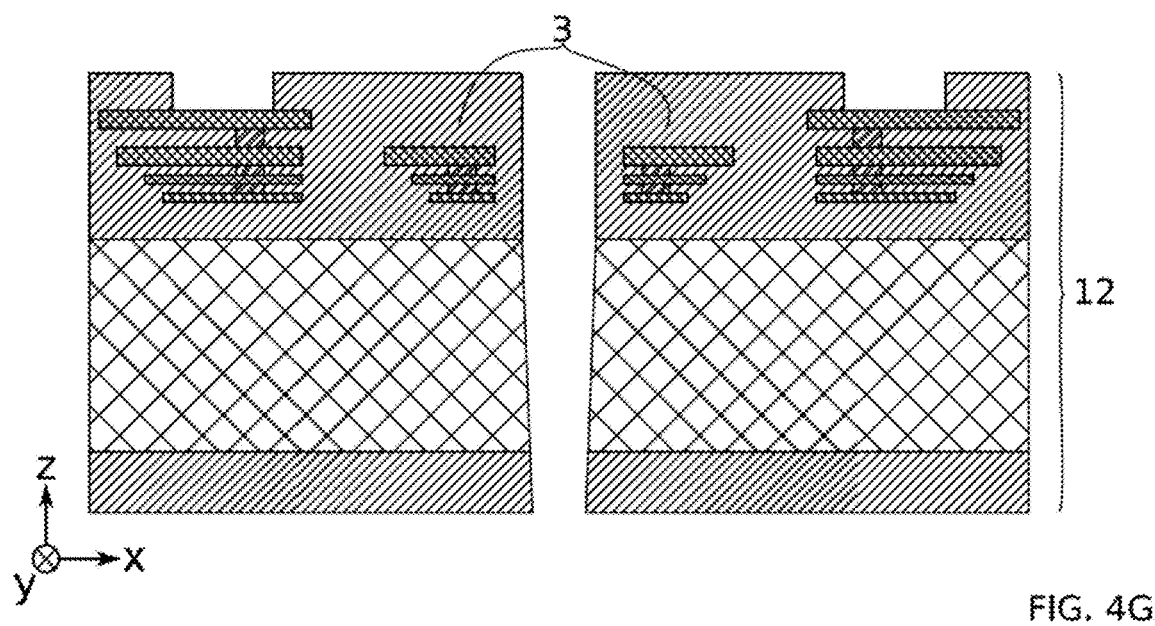
Figure 4H:
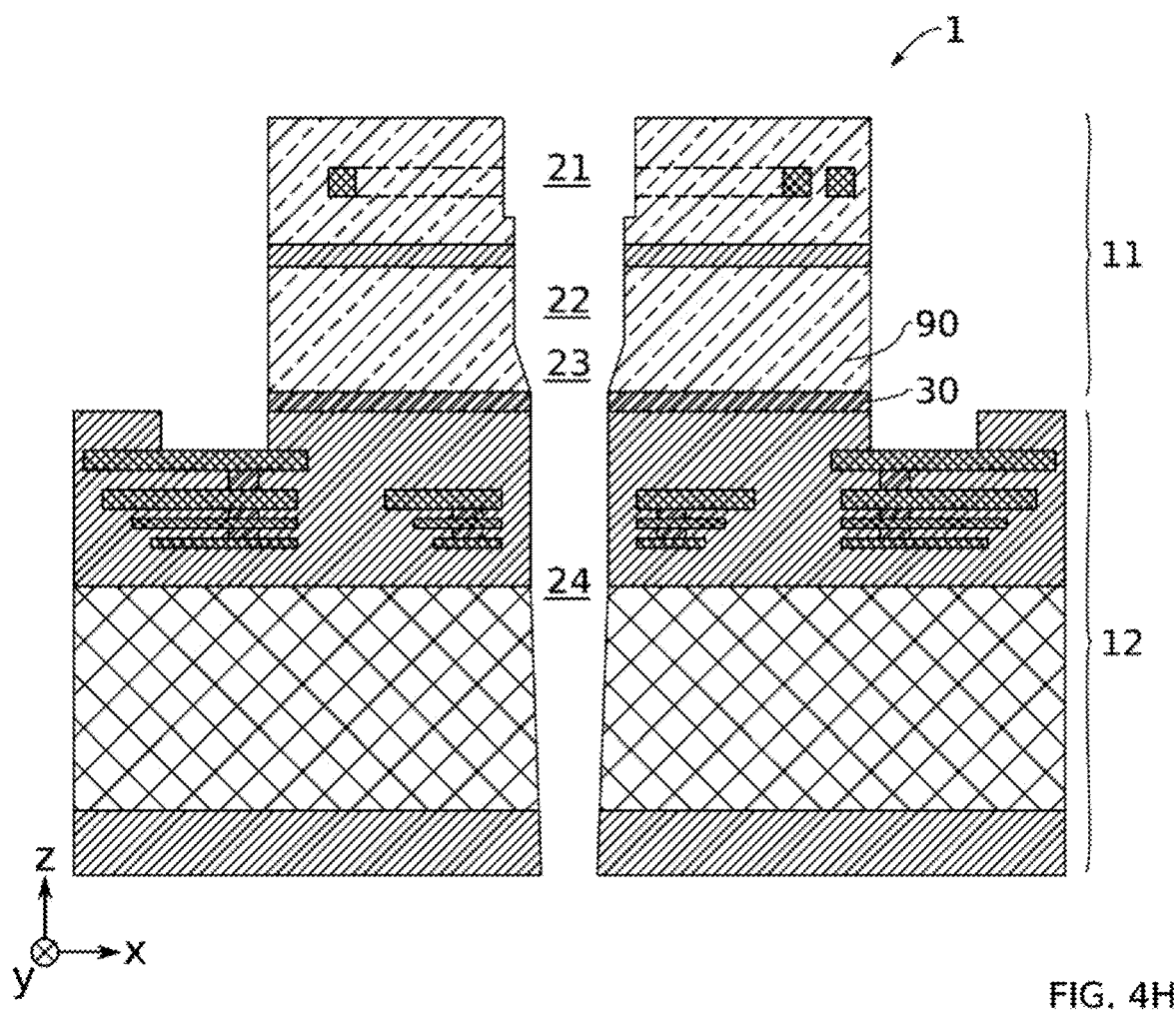

The resulting structure in FIG. 4F forms the top part 11 of the detector 1. This top part 11 is then assembled with a bottom part 12 of the detector, comprising a plurality of photodetectors 3. As shown in FIG. 4G, this bottom part 12 can typically be in the form of a hole-based CMOS imaging device. This hole-based CMOS imaging device is then assembled, for example by means of an optical adhesive 30, with the bottom face 91 of the support 90 (FIG. 4G). The optical adhesive 30 is typically transparent to the operating wavelengths of the detector 1. The top part 11 is positioned opposite the bottom part 12 so that the part 23 of the channel 2 coincides with the hole 24 of the CMOS imaging device. This alignment can typically be achieved via alignment marks. The channel 2 of the detector 1 thus comprises a plurality of parts 21, 22, 23, 24 through the substrate 5, through the support 90 and through the CMOS imaging device. A functional detector 1 is thus obtained. According to one possible alternative, the channel 2 is drilled after the top part 11 has been assembled with the bottom part 12.

Figure 5:
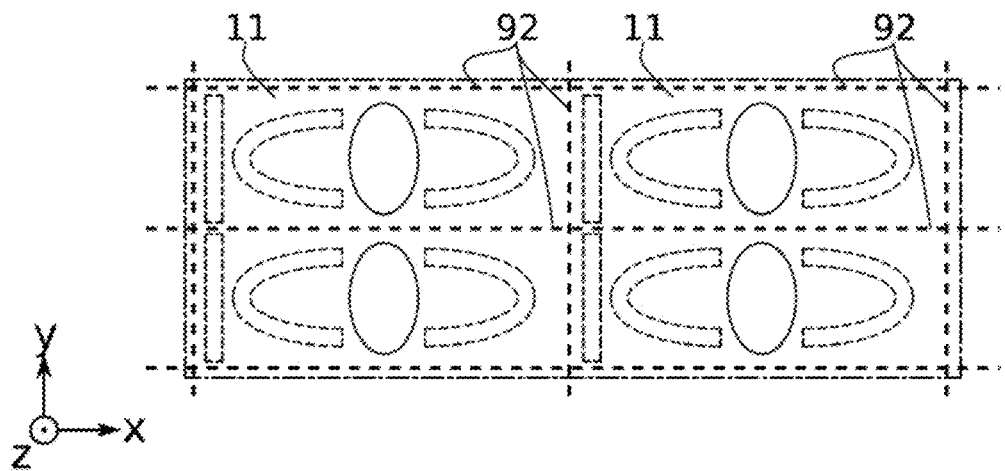
FIG. 5 diagrammatically shows an overhead view of a step of singulating optical waveguides and channels manufactured according to one embodiment of the present invention.

According to one possibility shown in FIG. 5, a plurality of top parts 11 are formed simultaneously side by side. Similarly, a plurality of bottom parts 12 can be formed simultaneously side by side. Typically a plurality of CMOS imaging devices is formed from one and the same silicon wafer, known as a CMOS wafer. A plurality of substrates 5 comprising optical waveguides 4 is formed from one and the same wafer made of fused silica, referred to as a first wafer. A plurality of supports 90 is formed from one and the same glass wafer, referred to as a second wafer. The first and second wafers are aligned relative to one another and assembled by Au—Au thermocompression bonding to form the plurality of top parts 11. A first cut is then made, at the cutting areas 92, so as to separate each top part 11.

This first cut can be made before transferring and assembling the top parts 11 with the bottom parts 12. Each top part 11 can thus be independently aligned and assembled with the CMOS wafer, using so-called "pick and place" equipment to independently select and place the top parts 11. A second cut is then made to separate the bottom parts 12 positioned underneath the top parts 11 from one another. A plurality of unit detectors, separated from one another, is thus obtained.

According to another possibility, the first cut is made after transferring and assembling the top parts 11 with the bottom parts 12. In such a case, a step of cleaning the glass residues is typically required between the first cut and the second cut.

A second example of the manufacture of a detector 1 is shown in FIG. 6A to 6E. Only the manufacture of the top part 11 of the detector 1 differs from the previous embodiment. The assembly with the bottom part and the cutting into unit detectors is carried out as described hereinabove.

Figure 6A:
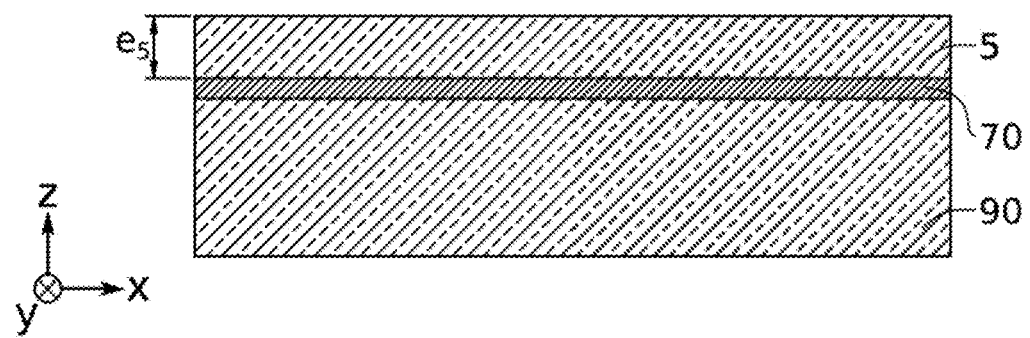
FIG. 6A to 6E diagrammatically show steps of a method for manufacturing a particle detector according to another embodiment of the present invention.

As shown in FIG. 6A, a metal layer 70, typically comprising a Ti adhesion layer and a gold layer, and having, for example, a thickness of 100 nm, is deposited on the transparent support 90, for example made of Borofloat 33 glass. The substrate 5 is thus formed directly on the metal layer 70, preferably by plasma-enhanced chemical vapour deposition (PECVD) of silicon oxide. The silicon oxide substrate 5 thus deposited has a thickness $e_5$ of 20 nm for example.

Figure 6B:
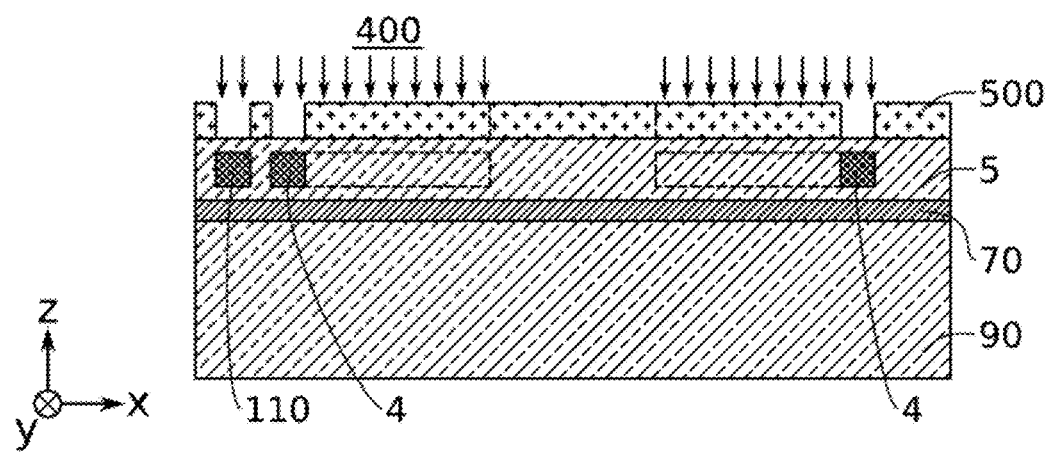

The optical waveguide 4 and/or the primary waveguide 110 are then produced by H+ ion implantation as described hereinabove. This implantation 400 can be carried out via a standard photolithography step based on a resin mask 500 (FIG. 6B).

Figure 6C:
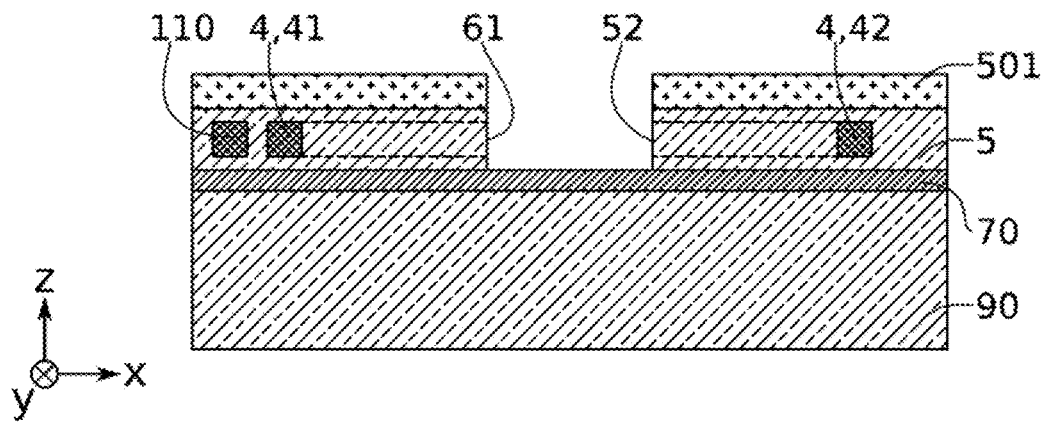

As shown in FIG. 6C, a second lithography step with the deposition of a resin mask 501 allows the silicon oxide of the substrate 5 to be etched between the two parts 41, 42 of the optical waveguide 4. This etch is typically an anisotropic etch along the z-axis configured to stop on the metal layer 70.

Figure 6D:
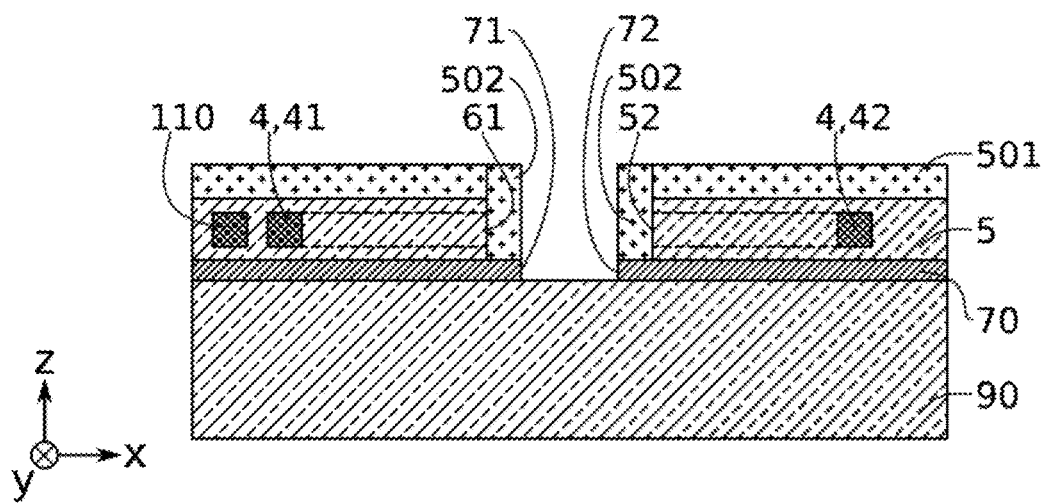

A protective resin layer 502 is then formed on the entrance 52 and exit 61 faces of the optical waveguide 4 (FIG. 6D). This protective layer 502 can be deposited by spraying and typically rests on the metal layer 70. It can have a thickness along the x-axis in the order of 10 µm. The exposed part of the metal layer 70 is then etched as far as the support 90. The parts of the metal layer 70 protected by the protective layer 502 advantageously form the edges 71, 72 of the mirror 7.

Figure 6E:
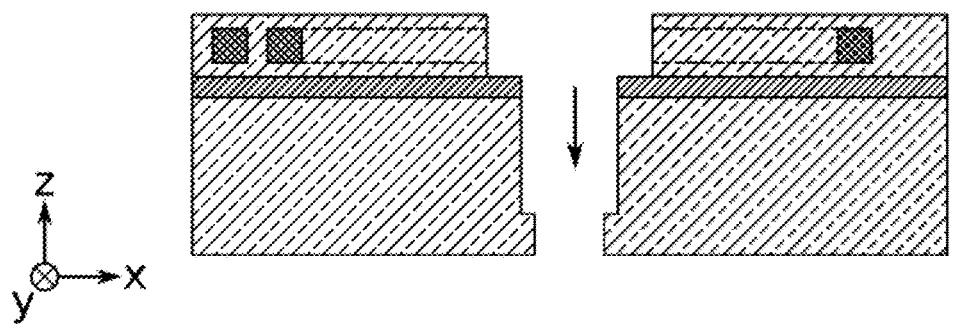

After the resin has been removed, the channel 2 can be drilled as described hereinabove to obtain the top part 11 of the detector 1 (FIG. 6E).

The invention is not limited to the embodiments described but extends to any embodiment within the scope of the independent claims.

The invention claimed is:

1. An optical particle detector comprising:
   at least one channel configured to receive a fluid carrying at least one particle, and across which light rays are configured to pass such that said light rays are partially scattered by the at least one particle,
   a plurality of photodetectors configured to receive said scattered light rays,
   wherein said detector comprises at least one optical waveguide comprising at least a first part and a second part separated from one another by the channel, the first part of the waveguide having a first entrance and a first exit opening out onto the channel and the second part of the waveguide having a second entrance and a second exit opening out onto the channel, said first and second parts being arranged in such a way that the first entrance faces the second exit and the second entrance faces the first exit, the optical waveguide being configured to:
   collect, at least at one entrance of the waveguide from among the first and second entrances, light rays that were not scattered by the at least one particle and having crossed the channel, and to
   reinject said unscattered light rays into the channel through at least one exit of the waveguide from among the first and second exits.

2. The optical detector according to claim 1, wherein the optical waveguide forms a discontinuous curved circuit crossed by the channel.

3. The optical detector according to claim 2, wherein the discontinuous curved circuit has an oval shape.

4. The optical detector according to claim 1, wherein the optical waveguide is configured to reinject at least 90% of the unscattered light rays back into the channel, after each passage of said unscattered light rays across the channel.

5. The optical detector according to claim 1, wherein the optical waveguide is surrounded by a substrate, and wherein the optical waveguide has a refractive index $n_g$ and the substrate has a refractive index $n_s$ such that $n_g - n_s = \Delta n$ and $0 < \Delta n \leq 0.1$.

6. The optical detector according to claim 5, wherein the optical waveguide is formed by the ion implantation of H+ hydrogen ions into the substrate, such that said optical waveguide comprises a buried region of the substrate having a hydrogen concentration comprised between $10^{19}$ cm$^{-3}$ and $10^{21}$ cm$^{-3}$.

7. The optical detector according to claim 1, further comprising a source and a primary waveguide coupled to said source and to the optical waveguide, wherein the light rays are emitted from said source and guided by the primary waveguide and injected into the optical waveguide by a critical coupling between the primary waveguide and the optical waveguide.

8. The optical detector according to claim 1, further comprising a metal mirror configured to prevent light rays not scattered by the at least one particle and not collected by the waveguide from accessing the photodetectors.

9. The optical detector according to claim 8, wherein the metal mirror is sandwiched between the optical waveguide and the plurality of photodetectors, stacked in a direction transverse to a main direction of propagation of the light rays from the exit of the optical waveguide.

10. The optical detector according to claim 9, wherein the metal mirror has an edge projecting from an entrance or from an exit of the optical waveguide, said edge being separated from the center of the channel by a distance $d_m$ that is shorter than a distance $d_g$ separating the entrance or the exit of the optical waveguide from the center of the channel, such that the optical waveguide is set back from the metal mirror relative to the center of the channel.

11. The optical detector according to claim 1, wherein the plurality of photodetectors is optically accessible from a wall of the channel.

12. A method for manufacturing the optical particle detector according to claim 1, comprising:
   providing a substrate;
   forming the optical waveguide by implanting ions into the substrate;
   forming the channel by drilling into the substrate at least at the optical waveguide, such that said channel crosses the optical waveguide, the optical waveguide thus comprising at least a first part and a second part separated from one another by the channel, the first part of the waveguide having a first entrance and a first exit opening out onto the channel and the second part of the waveguide having a second entrance and a second exit opening out onto the channel, said first and second parts being arranged in such a way that the first entrance faces the second exit and the second entrance faces the first exit;
   providing a plurality of photodetectors; and
   assembling the photodetectors of said plurality with the substrate, by disposing the photodetectors at least partially around the channel.

13. The method according to claim 12, wherein the ion implantation is a H+ hydrogen ion implantation.

14. The method according to claim 12, wherein the substrate is assembled with the plurality of photodetectors via at least one further layer, said at least one further layer comprising a transparent support.

15. The method according to claim 12, wherein the formation of the channel comprises at least one drilling operation selected from among laser drilling, mechanical drilling, and chemical drilling.

16. The method according to claim 12, wherein at least a part of the channel is polished so as to have an average surface roughness RMS of less than 2 nm.

17. The method according to claim 12, further comprising forming a metal mirror on one face of the substrate, said face being turned so as to face the photodetectors during assembly such that the metal mirror is disposed between the optical waveguide and the plurality of photodetectors.

18. The method according to claim 17, wherein the metal mirror is at least partially formed by a layer of gold, and assembly is carried out by thermocompression bonding from the layer of gold.

* * * * *